United States Patent [19]

Lorrek et al.

[11] 4,077,136
[45] Mar. 7, 1978

[54] RING SHAPED COOLING DEVICE

[75] Inventors: Johannes Lorrek, Mulheim (Ruhr); Josef Lorrek, Essen, both of Germany

[73] Assignee: Krupp-Koppers GmbH, Essen, Germany

[21] Appl. No.: 727,217

[22] Filed: Sep. 27, 1976

[30] Foreign Application Priority Data

Oct. 25, 1975 Germany .............. 2547882

[51] Int. Cl.² .............. F26B 19/00
[52] U.S. Cl. .............. 34/62; 34/13; 34/20; 214/62 R; 214/63
[58] Field of Search .............. 34/13, 20, 60, 22, 62; 432/77, 78, 85, 137, 138, 141; 214/58, 63, 62 A, 62 R; 105/261 R, 261 A, 241 C

[56] References Cited

U.S. PATENT DOCUMENTS

| 298,912 | 5/1884 | Stone | 214/62 R |
| 679,033 | 7/1901 | Peteler | 214/58 |
| 990,380 | 4/1911 | Ord | 214/63 |
| 1,321,826 | 11/1919 | Humphrey | 214/62 R |
| 1,607,035 | 11/1926 | Andrews | 214/63 |
| 3,620,392 | 11/1971 | Greenwood | 214/63 |
| 3,942,263 | 3/1976 | Muller | 34/20 |

FOREIGN PATENT DOCUMENTS 2,441,530  3/1976  Germany .............. 105/241 C

Primary Examiner—John J. Camby
Assistant Examiner—Henry C. Yuen
Attorney, Agent, or Firm—Michael J. Striker

[57] ABSTRACT

An annular frame has an outer and an inner wall defining a space therebetween and a plurality of wheels rotatably mounted on said walls. Carriages for carrying material to be cooled are located in said space adjacent each other. Each carriage has a pair of aligned pins fixedly connected thereto and turnably mounted in the frame, and a pair of levers fixedly connected at one end to the pins and extending transverse to the pins axes. Roller followers are fixedly mounted at the other ends of the lever. A pair of annular guide rails support the plurality of the wheels rotably mounted on the walls of the frame and are engaged by the roller followers. Each guide rail has in a zone of unloading of the carriages a downwardly curving portion. During riding of the roller followers over this portion the respective carriages tilt about the axes of the pins to thereby discharge the material from the carriages.

6 Claims, 3 Drawing Figures

RING SHAPED COOLING DEVICE

BACKGROUND OF THE INVENTION

The invention relates to a ring shaped cooling device for cooling hot particulate material, particularly hot iron ore cinder.

In the known art, for example, in the German Pat. No. 1,187,995, the cooling device comprises a first pair of guide rails over which the wheels of the frame ride. The device comprises also a second pair of guide rails, supporting the roller followers and having above mentioned downwardly inclined portion at a zone of unloading of the carriages. The second pair of the guide rails supporting the roller followers is located between the first pair of the guide rails over which the wheels of the frame ride.

The cooling device having the above mentioned first pair of the guide rails and second pair of guide rails located between the first pair has essential disadvantages. With this location of the pairs of guide rails the cooled particulate material, during discharging thereof from the carriages at a zone of unloading, drops onto the second pair of guide rails located between the first pair. Some portion of the cooled material continues to lie on these guide rails and hinders riding of the roller followers along said guide rails, thus making for difficulties in moving the carriages. The lateral location of the second guide rails supporting the roller followers makes access to the roller followers and to their pivots difficult and therefore complicates maintenance thereof. The existence of the external first pair of guide rails on which the wheels of the frame ride requires increasing in the lateral direction of the space occupied by the cooling device which is extremely undesirable in most cases. The existence of two pairs of guide rails also increases expenditures for the rails, the fastening members and for the supporting structures.

SUMMARY OF THE INVENTION

Accordingly, it is a general object of the present invention to overcome the disadvantages of the prior art.

More particularly, it is an object of the present invention to provide a cooling device which is of a simpler construction than the prior art devices and is correspondingly less expensive.

Another object of the present invention is to provide an improved cooling device which occupies less space than the prior art devices.

A further object of the present invention is to provide a cooling device in which the cooled material, during discharging thereof, does not drop onto the guide rails and therefore does not hinder riding of the carriages over the guide rails.

Still a further object of the invention is to facilitate access to and maintenance of the roller followers of the carriages and the pivots of the roller followers.

In keeping with these objects, and with others which will become apparent hereafter, the distinctive features of the present invention reside in a ring shaped cooling device comprising a pair of annular guide rails respectively supporting a plurality of wheels rotatably mounted on an outer and an inner wall of an annular frame and being also engaged by roller followers rotatably mounted on levers fixedly connected to pins which in turn are fixedly connected to carriages for carrying the material to be cooled. The guide rails have at a zone of unloading of the cooled material downwardly curving portions so that during riding of the roller followers over the downwardly curving portions the respective carriage will tilt about the axes of the pins connected thereto to thereby discharge the material therefrom.

So constructed, the device according to the invention comprises only one pair of guide rails for supporting both the wheels of the frame of the device and for being engaged by the roller followers of the carriages carrying the material to be cooled. The construction of the cooling device of the invention is simpler than the construction of the prior art device which comprises two pairs of guide rails, and correspondingly it is less expensive. It requires fewer rails, fastening members and support structures than the prior art construction. In the cooling device of the invention access to the roller followers and their pivots and therefore the maintenance thereof is very easy. The single pair of guide rails of the invention occupies less space in the lateral direction than the two pairs of guide rails in the prior art device.

Finally, it is also important that the existence of the single pair of guide rails and the free space therebetween, assures that during discharging of the carriages at the unloading zone portions of the cooled material will not be able to drop onto the guide rails and continue to lie there, hindering riding of the roller followers, and that therefore no difficulties in moving of the carriages will occur.

According to a further concept of the invention the cooling device comprises a plurality of outer and inner rotatably rollers rotatably mounted on the walls of the frame, and which have vertical axes of rotation and engage the respective guide rails. This provides very precise movement of the cooling device during the operation thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
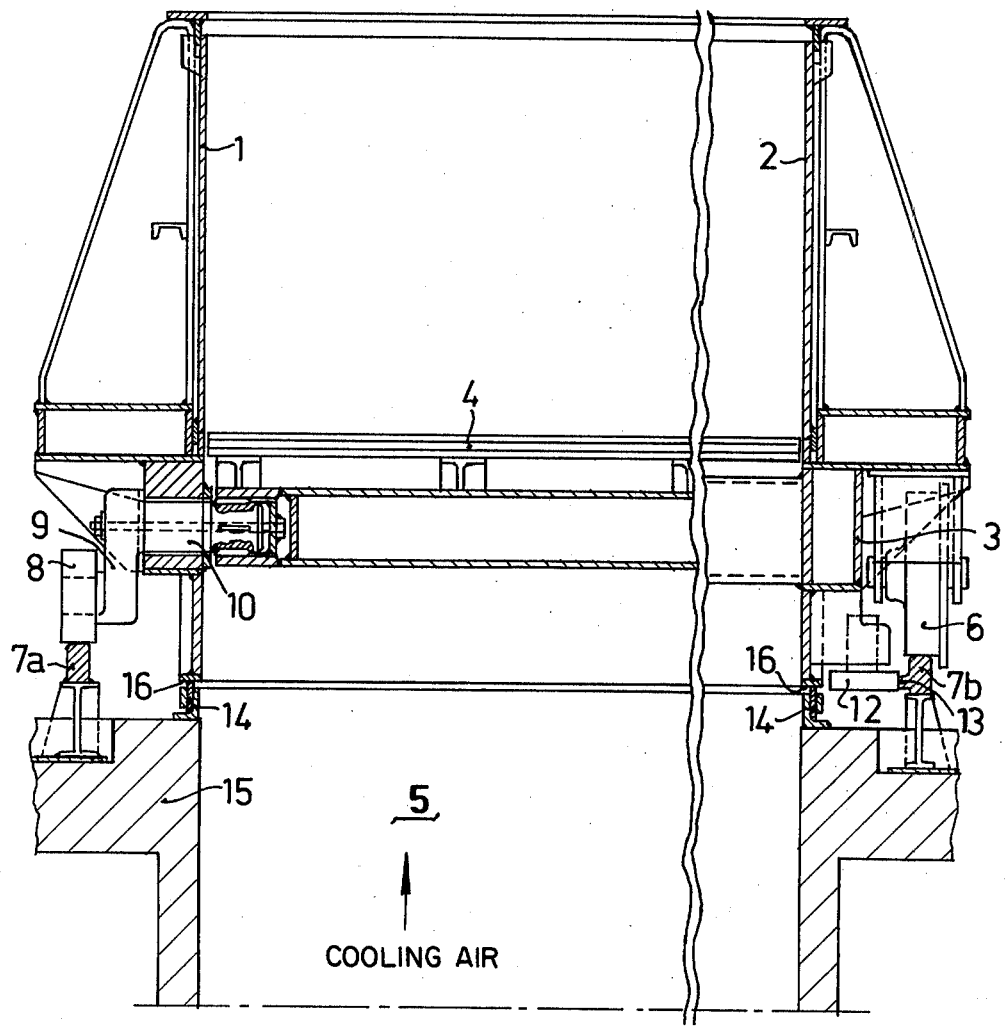
FIG. 1 is a diagonal cross-sectional view of the cooling device shown in FIG. 3, according to the present invention.
Figure 2:
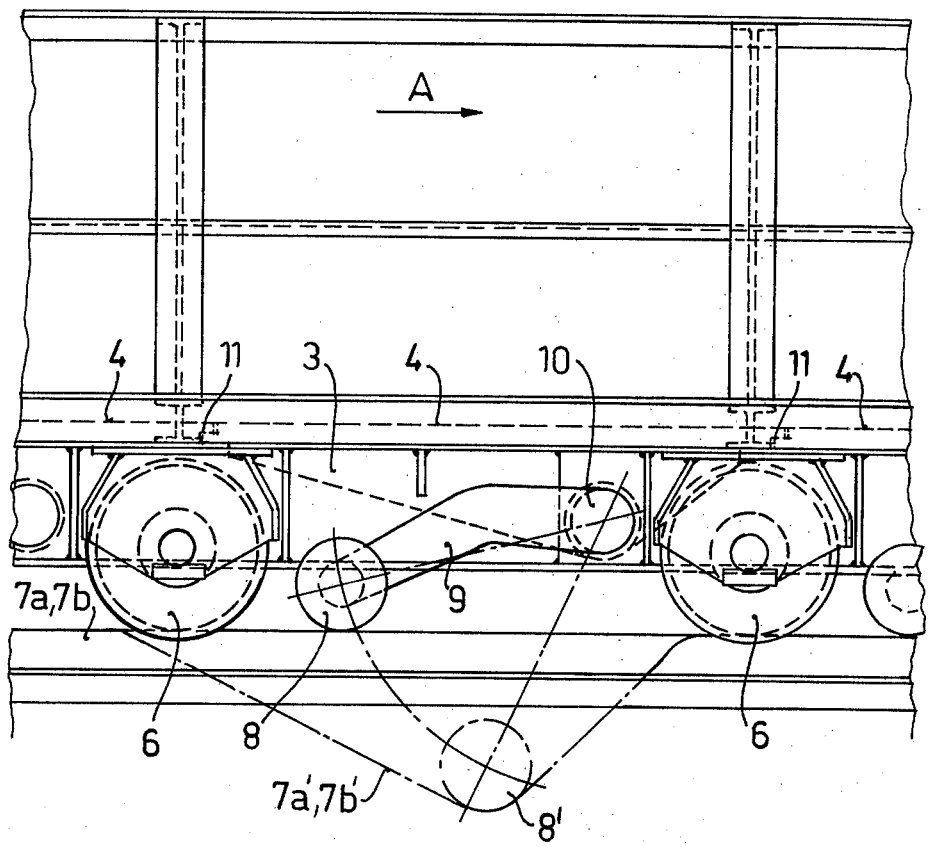
FIG. 2 is a side view showing the zone of unloading of the carriages.
Figure 3:
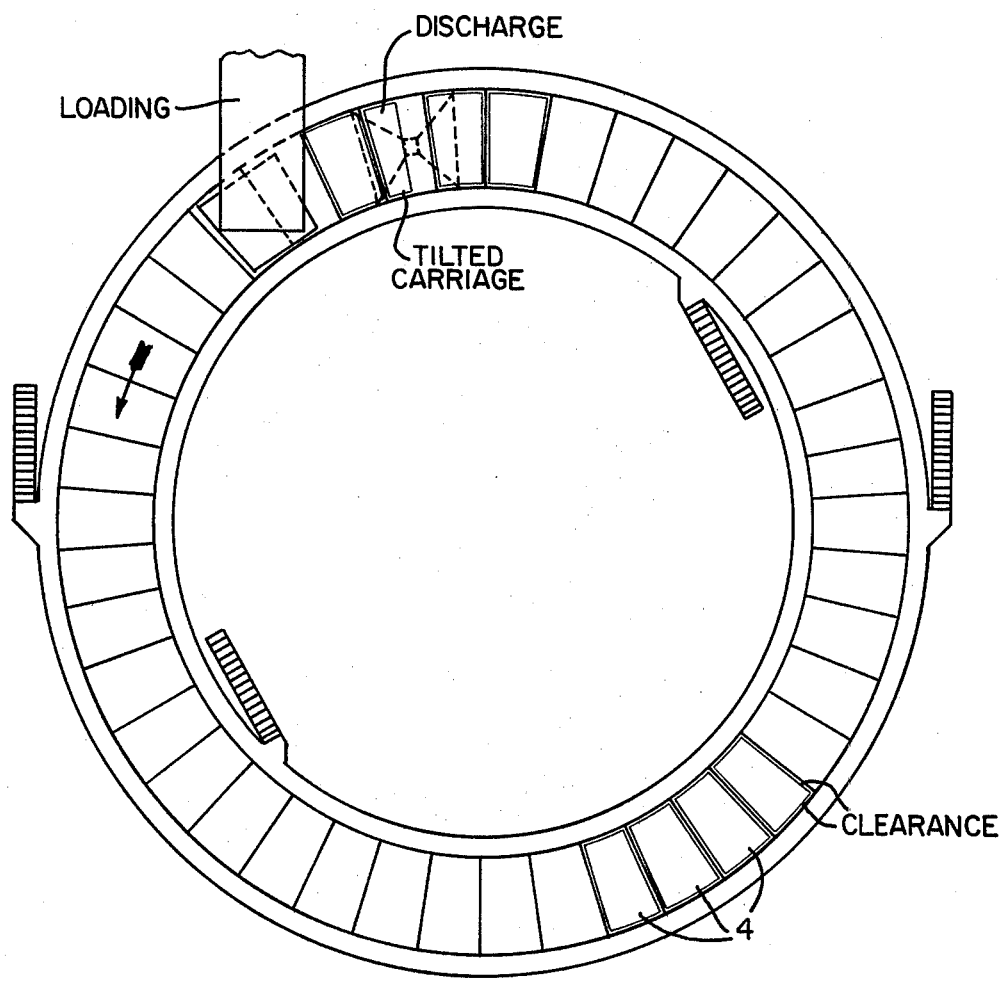
FIG. 3 is a top view of the cooling device.

FIGS. 1 – 3 illustrate one embodiment of the invention by way of example. As FIG. 3 shows most clearly, the cooling device according to the present invention is of a ring-shaped configuration and has an annular frame 3 which has an outer annular wall 1 and an inner annular wall 2. These walls define therebetween an annular space 5 open at the upper and the lower end of the frame 3. A plurality of wheels 6 is located outside said space 5 and are circumferentially spaced from each other. They are rotatably mounted on the outer annular wall 1 and the inner annular wall 2, respectively. A plurality of carriages 4 for carrying material to be cooled are located in the space 5 formed between the walls 1 and 2, and between the upper and the lower end of the frame 3. Preferably, each of said carriages has an upper flat face carrying the material. A pair of axially aligned pins 10 is provided for each carriage 4. The pins are turnably mounted in the frame, for example, they extend through holes in the frame 3 with a clearance, between the pins 10 and surfaces of these holes. The pins 10 are fixedly connected to the carriages 4 in a usual manner, for example by keys as shown in the drawing. Levers 9 are provided which are fixedly connected at one end thereof to the pins 10 and extend transverse to the pins axes. Roller followers 8 are turnably mounted at the other ends of each lever 9.

The device of the invention comprises a pair of annular guide rails 7a and 7b. The guide rails 7a and 7b, respectively support the plurality of the wheels 6 rotatably mounted on the outer annular wall 1 and the inner annular wall 2. The guide rails 7a and 7b are also engaged by the roller followers 8 of the carriages 4. As clearly shown in FIG. 2, the guide rails 7a and 7b have, at a zone for unloading the carriages 4, curving portions 7a' and 7b', respectively. During riding of the roller followers 8 over the curbing portion 7a' and 7b' the respective carriages tilt about the axes of the pins 10 connected to the carriages and the material is being discharged.

Each of the carriages 4 has at an end at which loading of the carriages begins, a projection 11 upwardly engaging an adjacent forwardly located carriage. In FIG. 2 the end from which loading begins is a front end in the direction of movement of the carriages 4 shown by the arrow A. The engaging of the projection 11 of the carriage with the forwardly located carriage assures that during loading of the corresponding carriage from the front end, this carriage, being engaged with the forwardly driving carriage, will not tilt and discharge the material loaded thereon.

The cooling device is also provided with a plurality of outer and inner rotatably rollers 12 which are rotatably mounted on the outer annular wall 1 and the inner annular wall 2 of the frame 3. The rotatably rollers 12 have substantially vertical axes and engage inner side walls 13 of the guide rails 7a and 7b. This engagement assures precise movement of the cooling device.

The cooling device of the invention comprises a support structure 15 having top face. The outer annular wall 1 and the inner annular wall 2 have bottom portions adjacent to the top face of the support structure 15. Sealing elements 14 are provided which are sealingly disposed between the bottom portions of the walls 1 and 2 and the top face of the support structure 15.

The cooling device of the invention operates as follows:

The carriages 4 are being loaded with the material to be cooled in the position of loading which is not shown in the drawing. The projection 11 at the front end of the carriage engages the forwardly riding carriage and assures that the loaded carriage will not tilt arbitrarily discharging the material. The frame 3 rotates with the carriage 10 in the direction of the arrow A, and during the rotation the material is being cooled by cooling air fed in the space 5. Since they are well known in the art, the source of cooling air and a device for feeding the air into the space 5 are not shown in the drawing. During the rotation of the frame 3 with the carriages 4, over the horizontal portion of the guide rails 7a and 7b the wheels 6 ride on the guide rails and at the same time the roller followers 8 follow the same guide rails. The engagement of the rollers 12 rotatably mounted on the outer annular wall 1 and the inner annular wall 2 of the frame 3 with the inner surfaces 13 of the guide rails 7a, 7b assures precise movement of the cooling device. During the consequent rotation of the frame 3 with the carriages 4, the corresponding carriage 4 reaches the zone of unloading at which the guide rails 7a and 7b have the downwardly curving portions 7a', 7b'. The roller followers 8 of the corresponding carriage 4 ride over this downwardly curving portions 7a' and 7b' as shown by reference numeral 8', the levers 9 and the pins 10 turn about the axes of the pins 10 and the carriage 4 tilts discharging the cooled material therefrom. During riding over the downwardly curving portions of the guide rails, the wheels 6 of the frame 3 lose contact with the guide rails which causes stresses in the frame 3. The construction of the cooling device is made rigid enough to prevent deformation of the corresponding parts thereof under these stresses. After unloading of the carriage 4, the frame 3 with the carriages 4 continues its rotation, the levers 9 and the pins 10 turn back, and the corresponding carriage 4 turns to the horizontal position.

During the entire operation the wheels 6 of the frame 3 and the roller followers 8 of the carriages 4 ride on the same guide rails 7a, 7b.

The existence of the same guide rails for the wheels of the frame and for the roller followers of the carriages provides a cooling device which is of a simpler construction, is less expensive and occupies less space than the prior art cooling device. The cooling device of the invention provides easier access to and maintenance of the roller followers and their pivots than the prior art device. In the cooling device of the invention the cooled material does not drop onto the guide rails during discharging thereof and does not hinder riding of the carriages over the guide rails.

It will be understood that each of the elements described above, or two or more together, may also find a useful application in other types of constructions differing from the types described above.

While the invention has been illustrated and described as embodied in a ring shaped cooling device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. A ring shaped cooling device for cooling hot particulate material comprising an annular frame having an outer and an inner annular wall connected to each other and defining an annular space therebetween open at the upper and lower end of said frame; a plurality of wheels located circumferentially spaced from each other outside said space and rotatably mounted on said outer and said inner annular wall, respectively; a plurality of carriages for carrying the material to be cooled located adjacent each other in said space between said opposite ends of said frame; a pair of axially aligned pins for each carriage, said pins being turnably mounted in said frame and fixedly connected to the respective carriage; a lever fixedly connected at one end to each of said pins outside said frame each extending transverse to the pin axis; a roller follower turnably mounted in the other end of each lever; a pair of annular guide rails respectively supporting the plurality of wheels which are rotatably mounted on said outer and said inner wall of said frame, said guide rails being also engaged by said roller followers, each of said guide rails having at a zone for unloading said carriages downwardly curving portions so that during riding of said roller followers over said downwardly curving portions the respective carriages will tilt about the axes of said pins connected thereto to thereby discharge the material therefrom.

2. The cooling device as defined in claim 1, further comprises a plurality of outer and inner rotatably rollers rotatably mounted on said outer and said inner annular wall of said frame, respectively, said outer and said inner rotatably roller having substantially vertical axes of rotation and engaging said outer and said inner annular guide rails, respectively.

3. The cooling device as defined in claim 1, wherein each of said carriages has upper flat faces carrying the material to be cooled.

4. The cooling device as defined in claim 1, wherein each of said carriages has an end from which loading of each of said carriages begins, each of said carriages having at said end a projection upwardly engaging an adjacent forwardly riding carriage.

5. The cooling device as defined in claim 1, further comprises a support structure having top face, said outer and said inner wall of said frame having bottom portions, and sealing elements sealingly disposed between said bottom portions of said walls and said top face of said support structure.

6. A ring shaped cooling device for cooling hot particulate material comprising an annular frame having an outer and an inner annular wall connected to each other and defining an annular space therebetween; a plurality of wheels located circumferentially spaced from each other outside said space and rotatably mounted on said outer and said inner annular wall, respectively; a plurality of carriages for carrying the material to be cooled located adjacent each other in said space; a lever fixedly connected at one end to each of said carriages outside said frame; a roller follower turnably mounted on the other end of each lever; a pair of guide rails respectively supporting the plurality of wheels which are rotatably mounted on said outer and said inner wall of said frame, said guide rails being also engaged by said roller followers, each of said guide rails having at a zone for unloading said carriages downwardly curving portions so that during riding of said roller follower over said downwardly curving portions the respective carriages will tilt to thereby discharge the material therefrom.

* * * * *